United States Patent [19]

Meikle et al.

[11] Patent Number: 4,776,402
[45] Date of Patent: Oct. 11, 1988

[54] METHOD AND APPARATUS FOR REMOVING EXCESS HOOF GROWTH

[76] Inventors: Keith H. Meikle, R.F.D. Box 193, Smithfield, Utah 84335; Brad W. Noble, 11255 N. 2000 East, Richmond, Utah 84333

[21] Appl. No.: 849,135

[22] Filed: Apr. 7, 1986

[51] Int. Cl.<sup>4</sup> ............................................. A01L 11/00
[52] U.S. Cl. .................... 168/48 A; 144/118; 51/209 R; 30/278; 30/351
[58] Field of Search ............ 168/45, 48; 144/118, 144/119 R; 51/106 R, 209 R; 30/276, 278, 347, 351

[56] References Cited

U.S. PATENT DOCUMENTS

| | | |
|---|---|---|
| 973,053 | 10/1910 | Langford . |
| 973,780 | 10/1910 | Harvey ................................. 168/48 |
| 989,793 | 4/1911 | Morris et al. . |
| 1,817,197 | 8/1931 | Kerns . |
| 2,085,603 | 6/1937 | Preston et al. ...................... 144/119 |
| 2,523,368 | 9/1950 | Howe . |
| 2,655,319 | 10/1953 | Johnson . |
| 2,703,119 | 3/1955 | Pullen .............................. 144/118 X |
| 2,839,108 | 6/1958 | Retz ................................. 144/118 X |
| 2,917,826 | 12/1959 | Pohr ........................................ 30/347 |
| 2,997,820 | 8/1961 | Skoog ................................. 51/209 R |
| 3,289,297 | 12/1966 | Casselman et al. ................... 30/347 |
| 4,116,200 | 9/1978 | Braun et al. . |

FOREIGN PATENT DOCUMENTS 893194 12/1981 U.S.S.R. ................................ 168/48

Primary Examiner—Robert P. Swiatek
Attorney, Agent, or Firm—Mallinckrodt & Mallinckrodt

[57] ABSTRACT

Excess hoof growth is removed from the hooves of dairy cows and other hooved animals by use of a power tool equipped with an apertured cutter disk whose upper face can be viewed by the operator so as to see an image of the field or area of cut through the rapidly rotating apertures and to thereby control the depth of cut. Circular series of open and preferably rectangular apertures and of cutting blades preferably associated with the apertures are advantageously canted diagonally from the radial to facilitate the making of very shallow cuts. The power tool is preferably a standard right-angle type normally used with grinder disks.

17 Claims, 2 Drawing Sheets

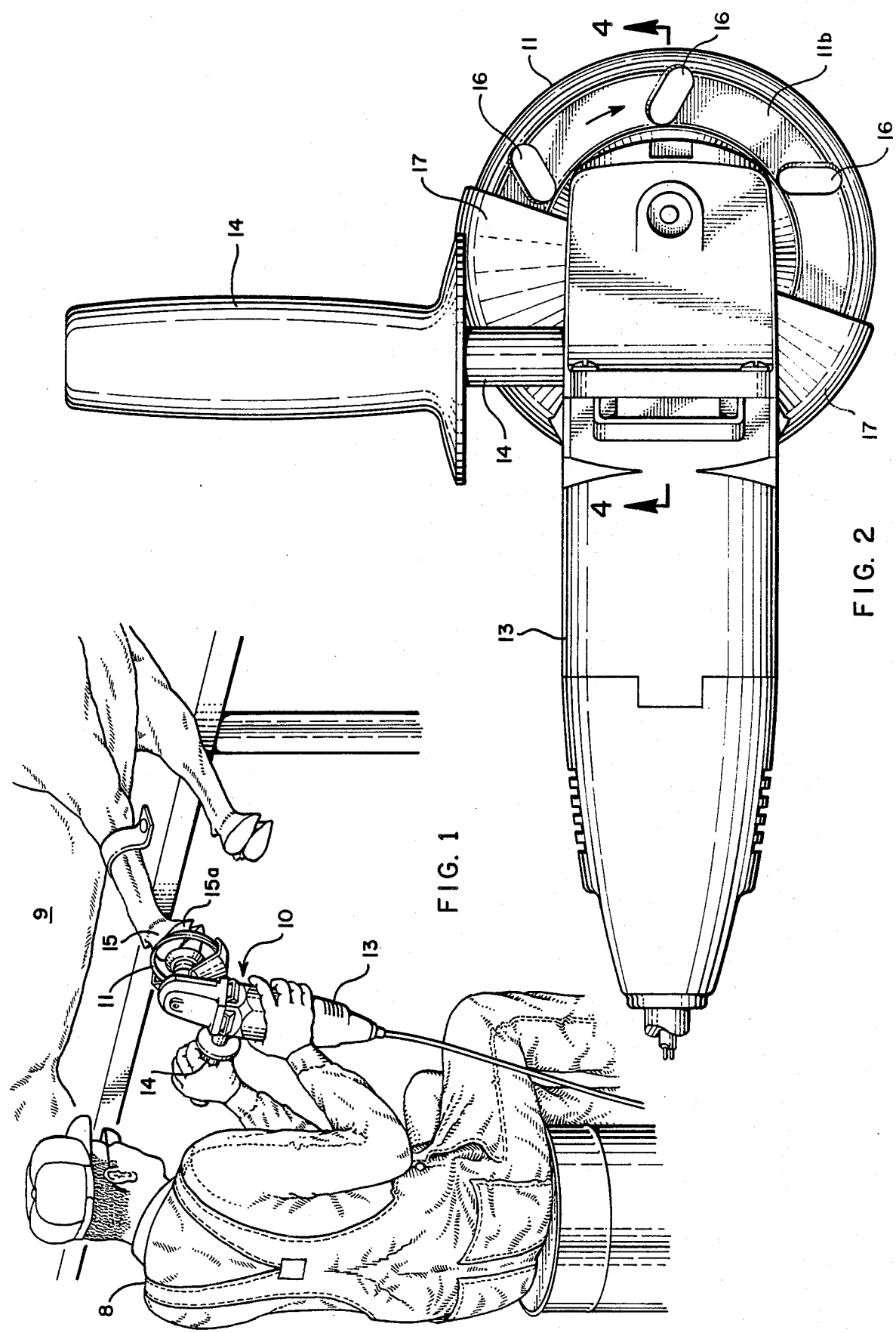

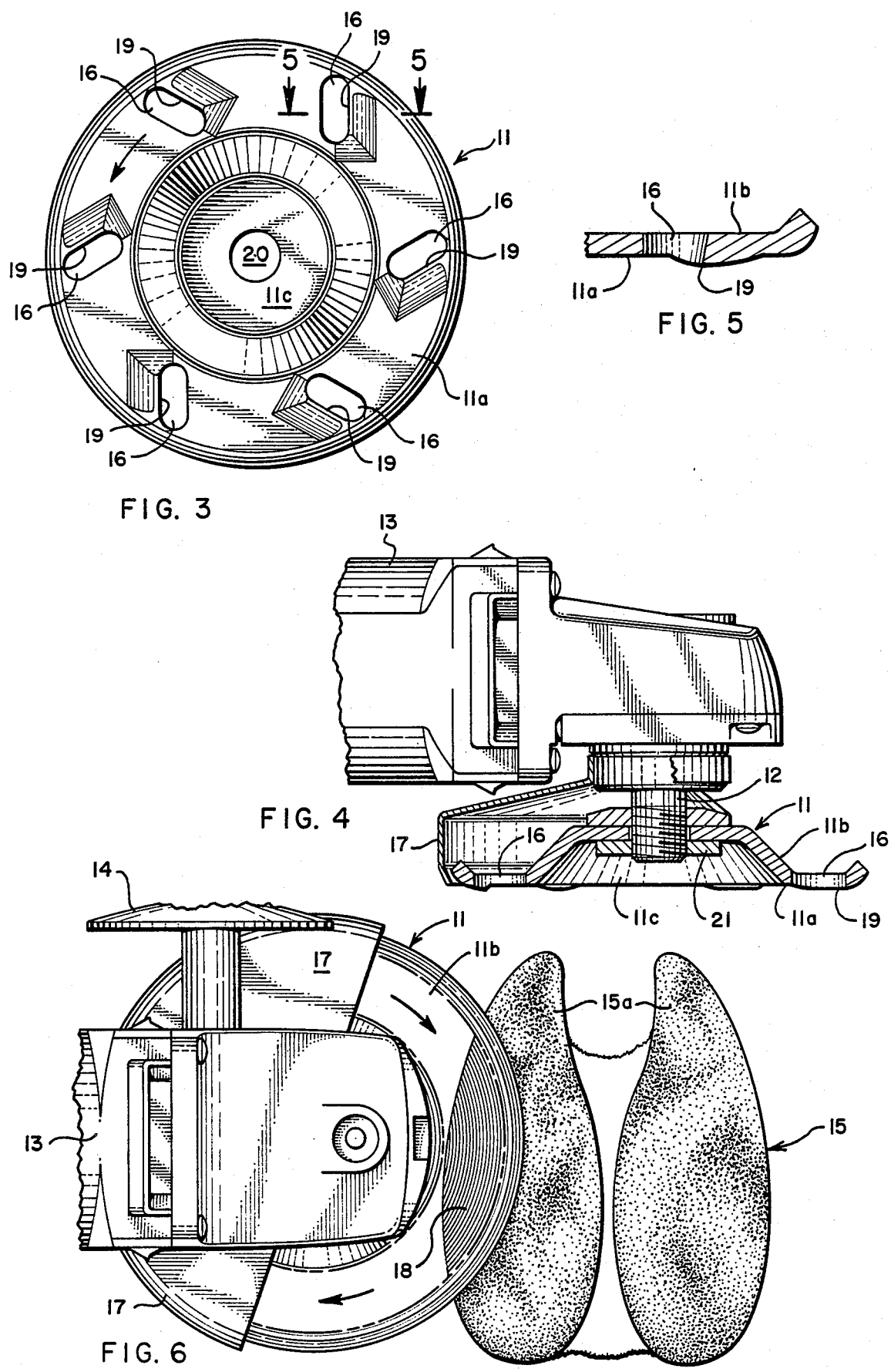

METHOD AND APPARATUS FOR REMOVING EXCESS HOOF GROWTH

BACKGROUND OF THE INVENTION

1. Field

The invention is in the field of hooved animal care and is particularly concerned with methods and means for removing excess hoof growth from such animals.

2. State of the Art

Although considerable attention has been paid in the past to the trimming of horses' hooves as they are shod and re-shod from time-to-time, a considerably greater chore faces dairy farmers caring for large herds of dairy cows that are normally kept in feed pens. Although these animals are not shod, excess hoof growth at and around the bottom faces of the hooves must be removed periodically. This has long been done manually by the dairy farmer or by a hoof trimming specialist using nippers. Great care must be taken in using the nippers, for a major artery comes close to the surface at the hoof bottom.

BRIEF SUMMARY OF THE INVENTION

In accordance with the present invention, a rotary power tool is provided for cutting the bottom surface and edge margins of a hoof while the operator observes progress directly through a flat disk cutter having a series of blades preferably arranged to protect against cutting too deeply into the hoof as the disk revolves at a high rate of speed.

To enable the operator to observe the progress of cutting below the disk, such disk is provided with a circular series of desirably elongate, peripherally closed apertures preferably corresponding in their positions, respectively, to the positions of the blades, but placed immediately in advance thereof. It has been found that, even though the apertures are narrow and the cutter disk rotates at high speed, e.g. 10,000 RPM, a continuous image of the circular cutting area under the disk is provided when the operator looks down on an exposed area of the upper surface of the rotating disk. This is very important to a dairy farmer, who must take off a maximum amount of the hoof growth if he is not to spend an unreasonable amount of time caring for his herd. Moreover, this must be done without danger of injuring the animals. Danger of injury is practically eliminated by providing the operator with a visual image of the field of cutting during the cutting operation.

The extent of opening of the apertures can be varied so long as they are effective to provide a visual cutting field below the cutter disk. They are advantageously rectangular so as to be open substantially uniformly along their lengths. Such rectangularly elongate apertures are preferably canted from radial orientation sufficiently to provide a diagonal approach of the several blades to the hoof surface, rather than a direct 180 degree confrontation, to guard against the making of cuts that are too deep. Since provision must be made for escape of the material cut off the hoof, it is desirable that the blades be associated with the apertures. Thus, it is advantageous that the margins of the apertures that trail in the rotational movement of the cutter disk be thickened and that their lower edges be sharpened as blades whose cutting edges are disposed slightly below the lower face of such disk, the apertures thereby serving for the escape of the cut material. It has been found that, even given the high rotational speed of the cutter disk, this does not effectively interfere with required visibility of the cutting area below the disk.

Although any rotary power tool that affords visibility of a significant area of the upper surface of the cutter disk during operation may be employed, a rotary power tool known commercially as a right angle, hand grinder is much preferred. Such a tool has a handle extending at right angles from an elongate electrical motor whose output shift is coupled at right angles to a work shaft to which grinder disks are attached for normally horizontal rotation on a vertical axis. In accordance with the present invention, the cutter disk replaces the usual grinder wheel. As so mounted for rotation, approximately the semicircular forward portion of the upper surface of such cutter disk is exposed to convenient viewing by the operator. Moreover, the weight of the power tool is effectively and easily supported by the operator with one hand grasping the handle and the other the motor casing. Thus, the depth of cut by the blades of the cutter disk is easily controlled.

THE DRAWINGS

The best mode presently contemplated for carrying out the invention in actual practice is illustrated in the accompanying drawings in which:

FIG. 1 is a perspective view of the power tool and cutter disk being held and used by a dairy farmer to cut off excess hoof growth from a hoof of a dairy cow immobilized for the purpose;

FIG. 2, a top plan view of the power tool and cutter disk;

FIG. 3, is a bottom plan view of the cutter disk per se, showing a preferred arrangement of the apertures and blades of the circular series thereof;

FIG. 4, a fragmentary vertical axial section taken on the line 4—4 of FIG. 2 and showing a portion of the power tool in elevation;

FIG. 5, a fragmentary vertical section taken transversely through one of the apertures on the line 5—5 of FIG. 3 and drawn to a larger scale; and FIG. 6, a fragmentary plan view showing schematically the cutting area of the hoof as seen by the operator looking toward the upper surface of the cutter disk as in FIG. 2.

DETAILED DESCRIPTION OF THE ILLUSTRATED EMBODIMENT

In the form illustrated, a commercially available power tool known as a right-angle hand grinder is designated generally 10 in FIG. 1, with a rotary cutter disk 11 instead of the usual grinder disk attached to its power output shaft 12, FIG. 4, whose axis of rotation is at right angles to the encased, elongate motor 13.

A handle 14 extends at right angles from the motor casing intermediate its length and is held by one hand of the operator 8, the other hand holding the motor, so the cutting face 11a of cutter disk 11 slopes slightly forwardly and lightly contacts the bottom surface 15a of a hoof 15 of an immobilized animal 9 held with bottom of hoof face-forward or face-up in the usual manner for the purpose of removing excess hoof growth.

Cutter disk 11 is provided with a circular series of peripherally closed bilaterally symmetrical apertures 16 extending therethrough about and concentric with its axis of rotation and defining an annular cutting area for the tool. Such apertures open into the lower, cutting face 11a of the disk and also into the opposite upper face 11b of the disk and extend across such cutting face 11a. The power tool and cutter disk are so constructed and arranged that at least a portion of the series of apertures 16 is open to the view of the operator holding the tool and looking toward upper face 11b of the cutter disk to provide a cutting control view of the cutting area below such cutter disk. Here, a substantially semicircular forward portion is exposed to view, as shown in FIG. 6, the remainder being covered by safety cover 17. Thus, as appears from FIG. 6, an image 18 of a cutting area below cutter disk 11 is provided the operator as such disk rotates so he can effectively control the depth of cut.

Cutting means at cutting face 11a of cutter disk 11 is preferably provided by a series of blades 19, see especially FIGS. 3 and 5, corresponding to the series of apertures 16 and located at the margins thereof that trail in the rotation of such disk, whereby the apertures provide for the escape of material cut from a hoof of the animal concerned as well as providing the desired view of the cutting area. To this end, the trailing defining margins of the several apertures are thickened, as shown in FIGS. 4 and 5, and sharpened to provide the blades 19 projecting slightly below the cutting surface 11a of cutter disk 11.

To facilitate control of the cutting operation, it is preferred that the blades 19 be canted diagonally from the radial, e.g. as illustrated. This means that cutting proceeds progressively along the length of each blade. In the form illustrated, the corresponding apertures are also similarly canted. Preferably, although rectangularly elongate, they have curved ends as shown.

From the standpoint of structural strength and to avoid excessive rubbing of the hoof by the cutter disk, such disk is preferably dished centrally, as at 11c, suitable provision being made at the center for attachment of such disk to power output shaft 12, as by a hole 20, FIG. 3, through which shaft 12 extends for threadedly receiving a nut 21, FIG. 4.

To enable sculpturing of a hoof rather than merely a flatwise planing thereof, the cutter disk has its rim 11c turned diagonally backwardly from the cutting face 11a as at 11c.

Although cutter disk 11 may be machined to shape from a billet of steel or cast to shape, it is preferred to stamp it to shape from heavy gauge steel sheet, e.g. ten gauge, by use of a suitable die, after which it may be but is not necessarily sharpened and case hardened. A suitable size for such disk is four and a half inches outside diameter fitting a standard four and a half inch power grinder tool. A satisfactory and presently preferred length for apertures 16 is one inch, with width of five-sixteenth of an inch, although this is subject to considerable variation so long as an effective field of vision is provided thereby for cutting control. Six of the apertures, evenly spaced around the outer margin of the disk, provide an excellent view of the area of cutting in a disk of the size indicated.

The field of cutting 18 viewed by the operator changes in color as the cutting goes deeper toward the artery or major blood vessels, which are located near the margins of the hoof, thereby enabling the operator to proceed very carefully as the field of view becomes rosy in color.

The open apertures are also highly advantageous in that they do not become clogged by the hoof material, which is somewhat rubbery.

Although the apparatus of the invention is especially useful for removing excess growth from the hooves of animals, it may have application to other special cutting requirements.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. A method of removing excess hoof growth from the hooves of hooved animals such as dairy cows, comprising holding a hoof of such an animal face-forward or face-up; holding a power tool, equipped with a rotary cutter disk having a lower cutting face and an opposite, upper viewing face, so that at least a portion of said cutting face opposite an exposed portion of said viewing face is in contact with the hoof, said cutter disk having a series of peripherally closed apertures arranged circularly about its rotative axis, opening into said disk faces, and canted diagonally to the radial, each aperture extending across substantially the entire radial extent of the viewing and cutting faces of said disk, and having cutting means at said cutting face, whereby the the cutting field of the hoof can be observed through the rotating cutter disk from said exposed portion of the viewing face for regulating the depth of cut; and regulating the depth of cut by observing the cutting area through said cutter disk and operating said power tool accordingly.

2. A method according to claim 1, wherein the cutter disk is rotated at about 10,000 RPM.

3. Apparatus especially for removing excess hoof growth from the hooves of hooved animals such as dairy cows, comprising a power tool having a rotary power shaft adapted to receive and rotate a rotary cutter disk; a rotary cutter disk attached to said power shaft and having mutually opposite, upper and lower, viewing and cutting disk faces, respectively; a circular series of peripherally closed bilaterally symmetrical apertures extending through said cutter disk about the axis of rotation thereof, opening into said disk faces, and canted diagonally to the radial, each aperture extending across substantially the entire radial extent of the viewing and cutting faces of the disk; and cutting means at said lower, cutting face of the disk, said power tool and said cutter disk being constructed and arranged so that at least a portion of said series of apertures in said upper, viewing face of the disk, effective to provide a view of the cutting field below the cutter disk at said upper face thereof, is open to view of the operator holding said tool and looking toward said upper face of the cutter disk.

4. Apparatus according to claim 3, wherein the cutting means comprises cutting blades operatively associated, respectively, with the trailing defining edges of the apertures of the series at the lower face of the cutter disk.

5. Apparatus according to claim 3, wherein the trailing defining edges of the apertures are sharpened to provide the cutting means.

6. Apparatus according to claim 5, wherein the rim of the cutter disk is turned diagonally backwardly from the cutting face of said disk.

7. Apparatus according to claim 3, wherein the cutting means are blades canted diagonally from the radial to provide for cutting progressively along their lengths; and wherein the apertures are substantially rectangular in shape.

8. Apparatus according to claim 3, wherein the cutting means comprise a circular series of cutting blades about the axis of rotation of the cutter disk and canted diagonally from the radial to provide for cutting progressively along their lengths.

9. Apparatus according to claim 3, wherein the apertures are rectangularly elongate.

10. Apparatus according to claim 9, wherein the apertures are approximately one inch in length and approximately five-sixteenths of an inch in width.

11. Apparatus according to claim 3, wherein the power tool is a right angle, hand tool provided with an elongate, encased, electric motor having a motor output shaft connected at right angles to a rotary power shaft to which the cutter disk is attached, and further provided with a handle extending angularly therefrom so the tool may be held by both hands of a user while viewing at least a portion of the upper face of said cutter disk.

12. Apparatus according to claim 3, wherein the cutter disk is stamped from sheet steel to provide areas along corresponding margins of said apertures, respectively, protruding from the lower face of the disk and having sharp cutting edges as the cutting means.

13. Apparatus according to claim 12, wherein the cutter disk is case hardened.

14. A rotary cutter disk adapted for mounting on the rotary power shaft of a power tool with at least a portion of the upper face of said disk exposed to the view of the operator so as to be especially useful for removing excess hoof growth from the hooves of hooved animals such as dairy cows, said cutter disk having mutually opposite, upper and lower, viewing and cutting disk faces, respectively; a circular series of peripherally closed bilaterally symmetrical apertures extending through said cutter disk about the axis of rotation thereof, opening into said disk faces, and canted diagonally to the radial, each aperture extending across substantially the entire radial extent of the viewing and cutting faces of the disk; cutting means at said lower, cutting face of the disk; and means for securing the cutter disk to the rotary power shaft of a power tool.

15. A cutter disk in accordance with claim 14, stamped from sheet steel to provide areas along corresponding margins of the apertures, respectively, protruding from the lower, cutting face of the disk and having sharp cutting edges as the cutting means.

16. A cutter disk according to claim 15, wherein the disk as stamped out is case hardened.

17. A method of removing excess hoof growth from the hooves of hooved animals such as dairy cows, comprising holding a hoof of such an animal face-forward or face-up; holding a power tool, equipped with a rotary cutter disk having a lower cutting face and an opposite, upper viewing face, so that at least a portion of said cutting face opposite an exposed portion of said viewing face is in contact with the hoof, said cutter disk having a series of peripherally closed apertures therethrough arranged circularly about its rotative axis, said apertures being of size sufficient that, collectively, they will present an effective working view of the cutting field of the hoof as the cutting disk rotates during the cutting operation, whereby the cutting field of the hoof can be observed through the rotating cutter disk from said exposed portion of the viewing face thereof for regulating the depth of cut; and regulating the depth of cut by observing the cutting area through said cutter disk and operating said power tool accordingly.

* * * * *